United States Patent [19]
Anderson et al.

[11] Patent Number: 4,607,161
[45] Date of Patent: Aug. 19, 1986

[54] FIBEROPTIC SWITCH SYSTEM

[75] Inventors: John C. Anderson, Houston; Ralf Eberlein, Missouri City; Morris J. Davies, Stafford, all of Tex.

[73] Assignee: Fiberdynamics, Inc., Houston, Tex.

[21] Appl. No.: 540,926

[22] Filed: Oct. 11, 1983

[51] Int. Cl.⁴ .............................................. H01J 5/16
[52] U.S. Cl. ..................................... 250/227; 250/229
[58] Field of Search ....................... 250/227, 229, 226; 340/365 P; 455/610, 612, 605, 606

[56] References Cited

U.S. PATENT DOCUMENTS

| | | | |
|---|---|---|---|
| 4,091,280 | 5/1978 | Ellis et al. | 250/227 |
| 4,223,217 | 9/1980 | Bongard et al. | 250/227 |
| 4,304,630 | 12/1981 | Tanner | 250/227 |
| 4,403,143 | 9/1983 | Walker et al. | 250/227 |
| 4,439,674 | 3/1984 | Amberny et al. | 250/227 |
| 4,506,153 | 3/1985 | Ohno | 250/226 |

FOREIGN PATENT DOCUMENTS

| | | |
|---|---|---|
| 16511 | 10/1980 | European Pat. Off. |
| 41830 | 12/1981 | European Pat. Off. |
| 75704 | 4/1985 | European Pat. Off. |
| 1523999 | 9/1978 | United Kingdom |
| 2051351 | 1/1981 | United Kingdom |
| 2066449 | 7/1981 | United Kingdom |
| 2077421 | 12/1981 | United Kingdom |
| 2109109 | 5/1983 | United Kingdom |
| 2117896 | 10/1983 | United Kingdom |
| 2119538 | 11/1983 | United Kingdom |

*Primary Examiner*—David C. Nelms
*Attorney, Agent, or Firm*—Dula, Shields & Egbert

[57] ABSTRACT

A fiberoptic limit switch system comprising a light source, an optical beamsplitting arrangement, a switch, an optical fiber, a detector, and output circuitry. The light source is a light-emitting diode. The switch is responsive to external stimulus. The switch comprises a housing, a receptacle for receiving the optical fiber, and a reflective surface movable between two positions within the housing. The optical fiber extends from the light source to the switch. The detector is arranged so as to receive light from the optical fiber and transmit a signal relative to the light emission. The output circuitry is electrically connected to the detector.

18 Claims, 8 Drawing Figures

FIBEROPTIC SWITCH SYSTEM

FIELD OF THE INVENTION

The present invention relates to fiberoptics and fiberoptic control systems. More particularly, the present invention relates to switching systems utilizing fiberoptics as a means for signal transmission.

BACKGROUND ART

Fiberoptics is the branch of physics concerned with the propagation of light that enters a thread or rod of transparent material at one end and is totally reflected back inward from the wall, thereby being transmitted within the fiber from one end to the other. Fiberoptics is widely applied in medical practice to observe the human body internally. Fiberoptic fibers have also been used to transmit light signals carrying information from both electronic and optical sensors.

Limit switches presently in use require an external electrical power source and electrical wiring for operation. Many problems have been encountered in the past in providing electrical power to these limit switches. In particular, such electrical power adds to electromagnetic interference levels that can create problems with other equipment being used. Electrical wiring and signals are vulnerable to short circuits in saltwater areas. Additionally, in areas or in usages having high explosive potential (e.g., oil or gas wells and grain bins), there is an inherent danger of explosions caused by short circuits within the fires from the electrical circuitry.

The prior art discloses many types of fiberoptic switching systems. U.S. Pat. No. 3,886,544 is a keyboard using optical switching in which the incoming light from an optical fiber is transmitted to a different optical fiber upon the pressing of a button on a keyboard. U.S. Pat. No. 4,057,719 describes in electro-mechanically actuated light switch which transfers light energy into or out of a fiberoptic light transmission path. Liquid material contained within the switch provides a continuity between two fiberoptic terminals in the fiberoptic light transmission path. U.S. Pat. No. 4,116,531 shows a fiberoptic switch arrangement utilizing an unclad light guide arranged adjacent to a diaphragm of absorbing material. U.S. Pat. No. 4,170,731 teaches a fiberoptic control module and system for providing an on/off control to light passing within an optical fiber bundle. U.S. Pat. No. 4,283,114 teaches a fiberoptic light valve in which the light valve is utilized as a sensor to detect mechanical motion or displacement. A piezoelectric element responds to pressure to generate an electrical signal. U.S. Patent 4,303,303 describes a mechanical optical switching device utilizing triangular prisms to redirect incoming and outgoing light. Other switching devices for use in conjunction with fiberoptics include: U.S. Pat. No. 4,304,460; U.S. Pat. No. 4,318,587; U.S. Pat. No. 4,322,126; and U.S. Pat. No. 4,327,963.

None of the above-stated patents provides a system whereby a single optical fiber transmits light to and from the limit switch. Each of the above-stated patents teaches complicated, expensive, and cumbersome methods for switching light flow into and out of a fiberoptic arrangement. Furthermore, it is believed that the prior art has not incorporated beamsplitters, commonly found in laser technology, to shift the flow of light as needed to properly operate a limit switch-type design.

It is an object of the present invention to provide a limit switch having no electronic or electrical components adjacent the area in which the switch is utilized.

It is another object of the present invention to provide a fiberoptic switching system which utilizes a single optical fiber path for the transmission of the signal light.

It is another object of the present invention to provide a fiberoptic switching system incorporating beamsplitter technology for the transfer of light from one source to another.

It is a further object of the present invention to provide a fiberoptic switching technology which is of relatively low cost, simply installed, high efficiency and effectiveness, and of greater reliability.

It is still another object of the present invention to provide a fiberoptic switching system that provides an indicator pertaining to fiberoptic path integrity.

These and other objects and advantages of the present invention will become apparent from a reading of the attached specification and appended claims.

DISCLOSURE OF THE INVENTION

Fiberoptics can be used to implement a completely self-powered, pressure sensitive limit/position detecting device to replace electrical limit switches. The switch of the present invention requires no outside electrical power source in the vicinity of the switch itself. This invention replaces the presently used limit switches, electrically connected to an external power source, with a device which utilizes fiberoptic transmission of light as the signal medium. The system involved eliminates the need for electric power connections or reference voltage to remote limit switch devices and eliminates the explosion hazard, electromagnetic interference problems, saltwater short circuits, and electrical hazards to personnel, as well as providing a non-galvanic connection. The only electronics involved are used in the operation of the light detection system in a location safely remote from that of the limit switch.

The present invention is a fiberoptic switch system comprising: a light source; a switch responsive to external stimulation; an optical fiber for transmitting light from the light source to the switch; a detector arranged so as to receive light from the optical fiber; and output circuitry electrically connected to the detector.

The light source of the present invention is a light-emitting diode (LED). The switch comprises a housing, a receptacle for receiving the optical fiber, a reflective surface positioned within the housing, and orientation means connected to the reflective surface for changing the relative position of the reflective surface with respect to the optical fiber. The interior of the housing is sealed from the external environment. The reflective surface is movable between a first and a second position. The first position is generally adjacent the optical fiber so as to reflect light from the optical fiber back toward the optical fiber. The second position is such that light from the optical fiber is reflected away from the fiber. The optical fiber comprises a single optical path.

The present invention further comprises a beamsplitter for passing the light from the light source to the optical fiber and passing the light from the optical fiber to the detector.

The detector comprises a photodetector positioned relative to the optical fiber so as to be electrically responsive to light emitted by the optical fiber. This detector includes an amplifier electrically connected to the photodetector, a rectifier electrically connected to the amplifier, and a filter electrically connected to the rectifier. A trigger circuit is connected to the filter for producing an output of fixed amplitude and duration.

The output circuitry of the fiberoptic switching system of the present invention includes a relay responsive to the signal of the detector. This relay produces an output signal relative to the light acting on the detector. A light-emitting diode having on/off capability responsive to the position of the reflective surface within the housing of the switch is included with this output circuitry. The output circuitry further includes a TTL output line for interface with computers external to the system.

Various alternative embodiments of this fiberoptic switching system are also within the realm of the present invention. The present invention may include a line-break detection means. This line-break detection means comprises a source of illumination, an optical fiber having a reflective surface at one end, a detector arranged so as to receive light from the optical fiber, and an indicator electrically connected to the detector. The optical fiber is arranged generally adjacent the fiberoptics connected to the switch. This optical fiber is arranged so as to receive light from the source of illumination. The detector is arranged so as to receive light from this optical fiber and is responsive to light from the optical fiber. The indicator produces a signal relative to the light received by the detector. This system serves to provide an indication of when the fiberoptics are severed or somehow removed from the switching device. Alternatively, the optical fiber of this arrangement can be the same as the fiberoptics connected to the switching system. In this alternative arrangement, a dichroic mirror is placed about the end of the optical fiber within the switch. The dichroic mirror reflects certain wavelengths of light while allowing other wavelengths to pass therethrough. The detection circuitry in this alternative arrangement should be responsive to the wavelength reflected by the dichroic mirror.

BEST MODE FOR CARRYING OUT THE INVENTION

Figure 1:
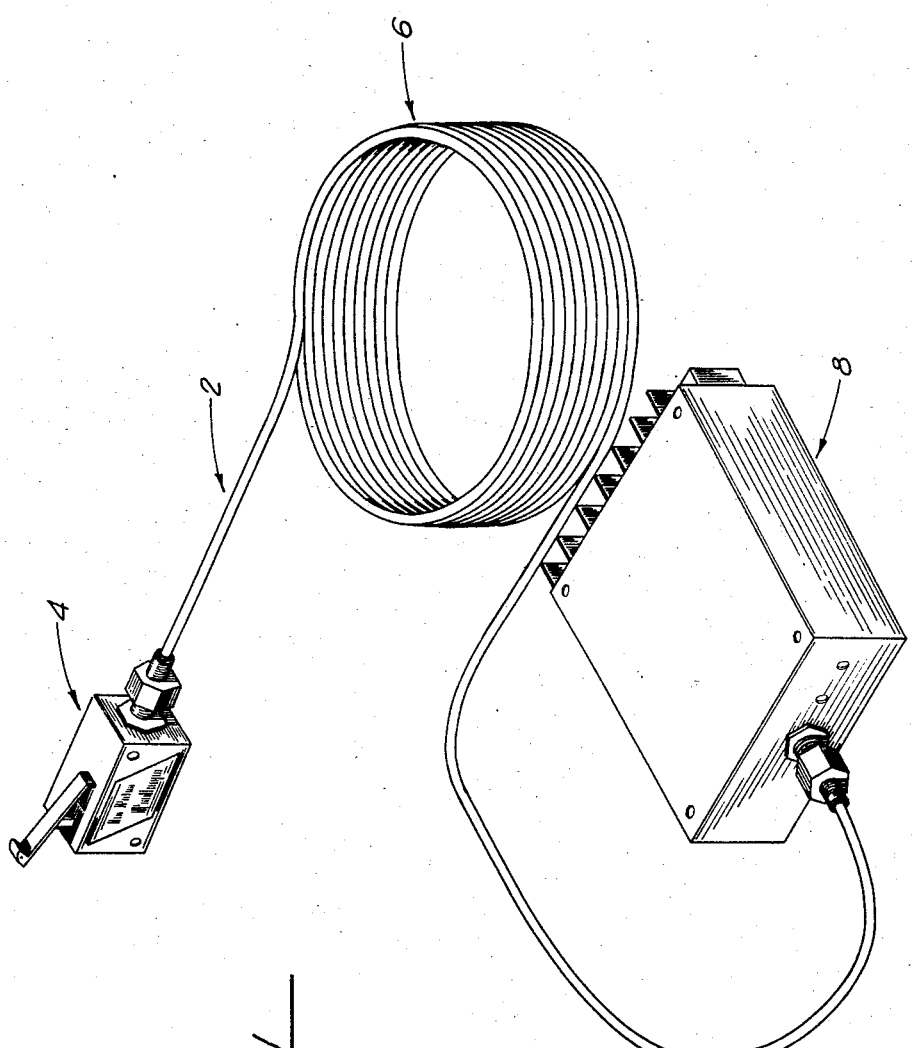
FIG. 1 is an isometric view of the fiberoptic switch system according to the present invention.

Referring to FIG. 1, there is shown at 2 a fiberoptic switch system for monitoring an external condition or stimuli, such as the position of a switch or moving part or some other physical condition which is desired to be monitored. Fiberoptic switching system 2 includes an optical switch 4 which detects changes in the monitored external condition, transmitting optical information or data signals via fiberoptic cable 6 to an electro-optic unit 8 where data from the switch 4 may be processed and stored or displayed.

Figure 2:
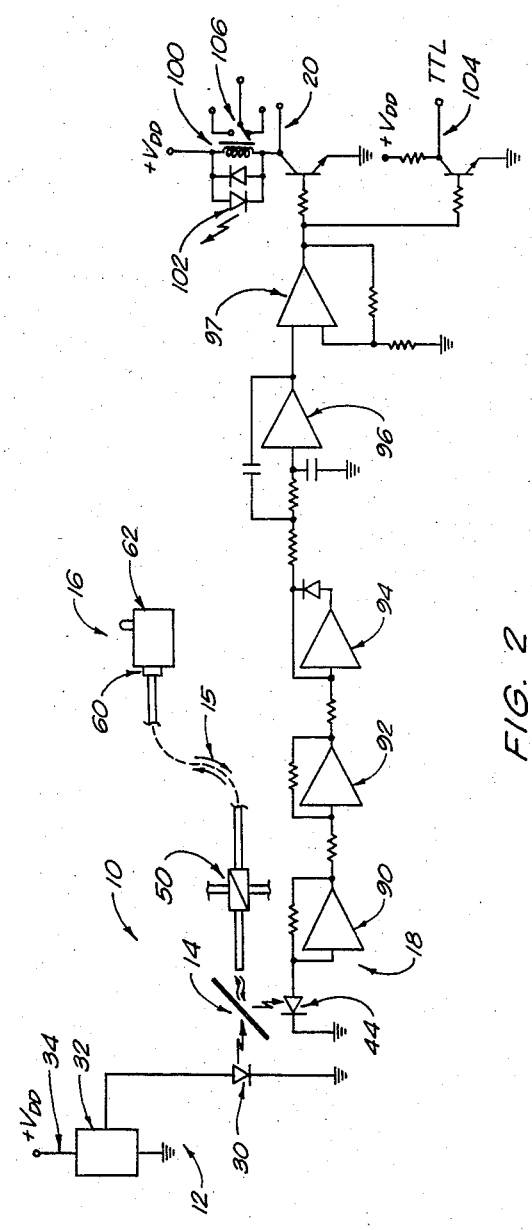
FIG. 2 is a schematical representation of the electronic circuitry of the fiberoptic switching system of the present invention.

Referring to FIG. 2, there is shown at 10 the electronics of the fiberoptic switching system of the present invention. Specifically, the fiberoptic switching system 10 comprises light source 12, beamsplitter 14, fiberoptics 15, switch 16, detector 18, and output circuitry 20. Each of these components combine to form the fiberoptic switching system according to the present invention.

Light source 12 includes a light-emitting diode 30. Light-emitting diode 30 is a semiconductor device that produces a visible or invisible luminescence when a voltage is applied to it. The voltage for light-emitting diode 30 is received from the LED oscillator driver 32. Oscillator driver 32 is powered by input voltage 34.

Light-emitting diode 30 is connected and coupled to beamsplitter 14. Beamsplitter 14 includes a housing which contains the beamsplitter and receives the light source, optical fiber, and detector components of the present invention. Specifically, beamsplitter 14 is an optical arrangement that reflects part of the beam of light and transmits part of that beam of light. The fiberoptics 15 are arranged such that the optical fiber receives the light as transmitted by LED 30. Photodetector 44 is also connected to the beamsplitter 14. In the preferred embodiment of this invention, these components are arranged such that light will be transmissive therebetween. In other words, light from LED 30 should pass through the beamsplitter and be received by fiberoptics 15. The light returning through fiberoptics 15 from switch 16 is reflected off beamsplitter 14 and is received by photodetector 44.

Fiberoptics 15 is a single optical path extending from beamsplitter 14 to switch 16. Optical fiber 15 is a type of transmission media that allows light to be transmitted long distances and around corners with little loss and without interference from other light sources. Optical fiber 15 is a very thin tube of quartz, glass, or plastic which is designed to transmit a beam of light from one end to the other by essentially reflecting it from side to side as it travels down the fiber. In accordance with the present invention, fiberoptics 15 comprises a single optical fiber pathway. One end of fiberoptics 15 is coupled to the beamsplitter 14 and arranged so as to receive light from LED 30. The light from LED 30 will travel along optical fiber 15 to its other end at switch 16. In FIG. 2, a connector coupling 50 is illustrated to show that optical fibers may be joined end to end to form the single optical pathway. Many individual optical fibers may be joined, in end-to-end relationship, to form the single optical pathway. As a result, optical fiber 15 may have a length as long as several kilometers. This maximizes the distance between the electrical circuitry of the present invention and the potentially hazardous environment of switch 16.

Figure 3:
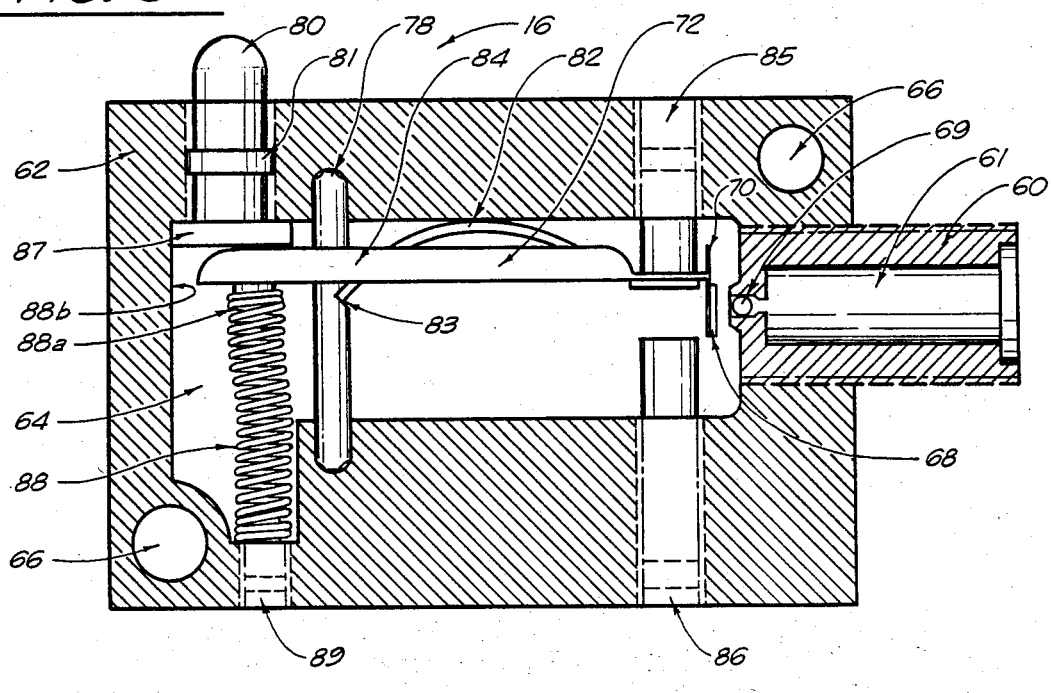
FIG. 3 is an elevation view taken in partial cross-section of the switch of the fiberoptic switch system of the present invention. This view shows the interior of the switch when the plunger is in its "up" position.
Figure 4:
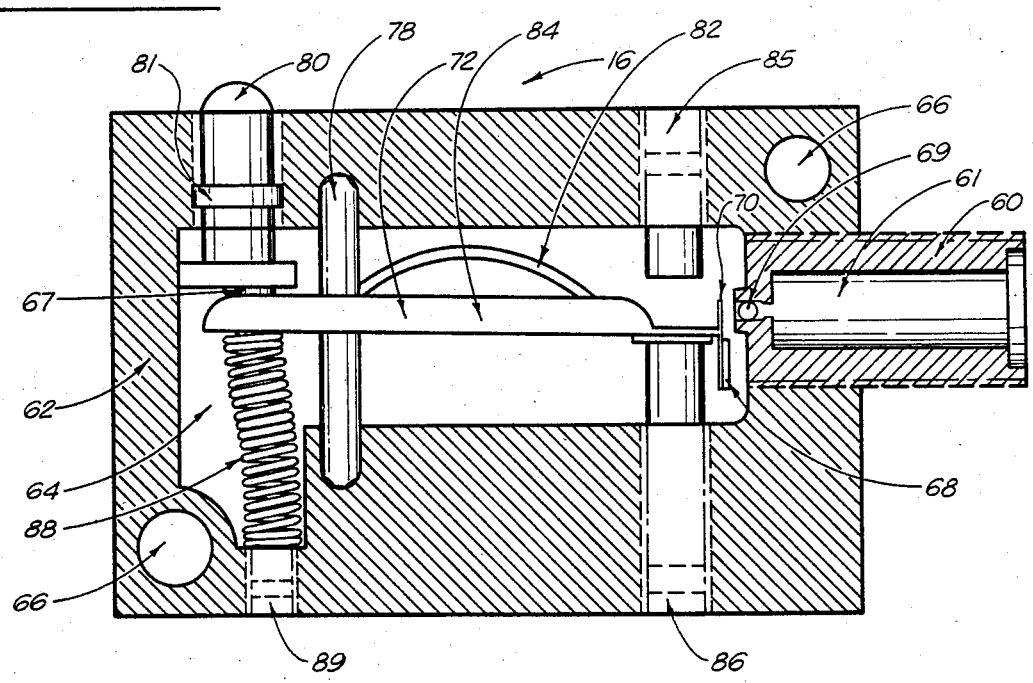
FIG. 4 is an elevation view taken in partial cross-section of the switch of FIG. 3 showing the interior of the switch when the plunger is in its depressed position.
Figure 5:
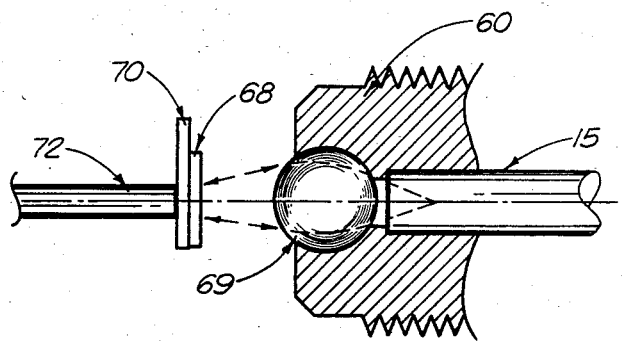
FIG. 5 is an enlarged cross-sectional view of the reflective surface in relation to the optical fiber of the present invention.

FIGS. 3 and 4 illustrate the preferred embodiment of switch 16. The end of optical fiber 15 is coupled to switch 16 through connector 60. The exterior of connector 60 is designed so as to receive a male connector attached to the optical fiber. A housing arranged about the end of the optical fiber 15 is adapted to be received by orifice 61 of connector 60. When connected, the end of optical fiber 15 is received by connector 60 as seen in FIG. 5.

Switch 16 is formed by housing 62 having internal cavity 64. Housing 62 may be made of metals or plastics or other materials particularly suitable to the environment to which the switch will be subjected. Typically, the housing 62 is made of two sections connected together by glue, welds, bolts, or other means. As shown in FIGS. 3 and 4, these sections are connected together by screws fitted into areas 66.

Reflective surface 68 is located on the interior of switch 16. Reflective surface 68 is shown as generally adjacent to one end of optical fiber 15. A ball lens 69 is interposed by the end of optical fiber 15 and reflective surface 68. The ball lens 69 serves to focus the light from the optical fiber toward the reflective surface and vice versa. The balls lens 69 also physically seals the system from the external environment, such as moisture or dust. Typically, reflective surface 68 is a mirror that will reflect the light from optical fiber 15 back toward optical fiber 15. Reflective surface 68 is mounted onto optical plate 70. Optical plate 70 has the capacity to move between a first and second position. The first position is illustrated in FIG. 3 and the second position is illustrated in FIG. 4. Optical plate 70 is fastened to leaf spring 72. Leaf spring 72, in conjunction with the other interior components, causes the optical plate to move between its two positions. Leaf spring 72 is mounted about support tab 78. Support tab 78 is fastened to the interior of housing 62 at each of its ends. Support tab 78 is essentially a stationary member within the interior of switch 16. Leaf spring 72 is attached, at its other end, to plunger 80. A positioning spring 82 is extended between spring tensioner 78 and flexing spring 72. A central bowed member 82 is formed about leaf spring 72 and is mounted at one end to notch 83 of support tab 78. The other end of member 82 is integrally fastened to leaf spring 72. Raised side plates 84 are formed to ensure proper alignment of the leaf spring 72 during movement between the normal and depressed positions. Set screws 85 and 86 extend through the housing 62 to internal cavity 64. Set screws 85 and 86 have their ends on opposite sides of leaf spring 72 and can act as stops on the movement of spring 72. These set screws serve to adjustably define the first and second positions of reflective surface 68 within the internal cavity 64. Set screws 85 and 86 also include seals (not shown) to isolate the interior of cavity 64 from the external environment.

The switch system of the present invention includes a plunger 80 which extends from internal cavity 64 through an opening formed in housing 62. The plunger 80 has an upper contact surface adapted to be contacted by a portion, such as the lever as seen in FIG. 1, of the external condition being monitored by the fiberoptic switch system. A suitable seal, such as O-ring 81 is mounted about the surface of the plunger 80 so as to isolate the internal cavity 64 from the external environment of switch 16. A lower base portion 87 is formed on the lower portion of plunger 80 for limiting the upward travel of the plunger 80. The plunger 80 is normally biased in an upward position (as shown in FIG. 3) by a bias spring 88. Bias spring 88 is in mechanical contact with plunger 80 through one end of leaf spring 72. The upper portion of the bias spring 88 is retained in place by a downwardly extending lug 88a formed about leaf spring 72. A flat surface is formed on base 87 to ride along and contact wall 88b of the internal cavity 64. This surface serves to ensure that the plunger 80 moves substantially vertically with respect to housing 62 as its position is changed from a normal position (FIG. 3) to the depressed position (FIG. 4). An adjustment set screw 89 is mounted in an opening in the housing 62 and extends into internal cavity 64. This set screw 89 is used to control the force exerted on plunger 80 by the bias spring 88. Suitable seals are maintained about set screw 89 so as to isolate the internal cavity 64 from the exterior environment.

As can be seen from FIGS. 3 and 4, the reflective surface 68 moves between two positions with respect to the end of optical fiber 15. When the plunger 80 is depressed, gradual movement in response to the depressing forces begins. At a transition position between the normal and depressed positions, the leaf spring 72 exerts a snapping action, rapidly and firmly transferring the position of the switch to its depressed position. The switch remains in this depressed position, and the reflective surface 68 away from the optical fiber, until the force depressing the plunger 80 is removed. At this time, the switch is then snapped promptly and firmly into the normal position of FIG. 3. A further description of the operation of this switch in conjunction with the fiberoptics and electronic circuitry of the present invention is more completely described hereinafter.

Detector 18 is comprised of photodetector 44, light amplifier 90, voltage amplifier 92, rectifier 94, filter 96 and trigger circuit 97. Light amplifier 90 and voltage amplifier 92 are electrically connected to photodetector 44 so as to improve the quality and increase the strength of the signal, produced by photodetector 44, to the level required for the output circuitry. Rectifier 94 converts the AC input into a DC output. Filter 96 is electrically connected to rectifier 94 and serves to remove the noise outputs of photodetector 44 from acting on output circuitry 20. Trigger circuit 97 is electrically connected to filter 96. This trigger circuit 97 produces an output of fixed amplitude and duration. This circuit sets a threshold level of voltage which determines whether the switch is definitely on or off. It eliminates many of the problems caused by minor changes in voltages.

The output circuitry of the present invention comprises relay and driver 100, LED 102, and TTL output 104. Relay and driver 100 produces a switching signal relative to the actions of switch 16. Relay and driver 100 can be used to connect with auxiliary equipment so as to activate this auxiliary equipment in response to conditions acting on switch 16. LED 102 is similarly activated in response to the external stimulus affecting switch 16. As shown in FIG. 2, the light-emitting diode 102 is activated when light is reflected from switch 16 through fiberoptics 15. Alternatively, the light-emitting diode is off when light is not reflected from switch 16. LED 102 serves as a visual indication of the light passing through fiberoptics 15 and serves as an indicator for link integrity. Alternative embodiments that enhance the ability of this switch system to monitor link integrity are described later hereinafter. TTL output 104 is a transistor-transistor logic circuit. As used within the present invention, this TTL output 104 transmits the signal from the fiberoptic switching system to a computer external of the system. This circuit allows the present invention to be integrated with computerized control and monitoring systems.

The operation of the present invention is described hereinafter. The switch 16 has a two-state operation. The first state is where the reflective surface 68 is generally adjacent the end of optical fiber 15. In this state, light source 12 passes light through beamsplitter 14 and into the end of optical fiber 15 about connector 50. Light travels along optical fiber 15 until it reaches its end within switch 16. As seen in FIG. 5, the light passes from the end of optical fiber 15, through ball lens 69, and is directed and focused onto reflective surface 68. Reflective surface 68 reflects the light back to the end of optical fiber 15. This light then passes back through optical fiber 15 and is emitted at the end adjacent connector 50. This light then is reflected off beamsplitter 14 and is received by photodetector 44. A signal is created by the impingement of light upon photodetector 44. This signal passes through amplifiers 90 and 92, rectifier 94, filter 96, trigger circuit 97, and produces an output signal in relay 100, LED 102, and TTL output 104. In operation, LED 102 will be illuminated indicating that light is reflecting through optical fiber 15. Similarly, this signal causes the relay to remain in its normal state. The signal is also transmitted through TTL output 104 as input to connected computer systems.

The second state of the fiberoptic switching system of the present invention occurs when light is not reflected from switch 16 back through optical fiber 15. As before, light is emitted by LED 30, passes through beamsplitter 14 and into one end of optical fiber 15. The light travels the path of optical fiber 15 and is emitted at its other end within switch 16. In this second state, plunger 80 is depressed. This causes optical plate 70, along with reflective surface 68, to move downwardly within the internal cavity 64 of switch 16. Reflective surface 68 is moved away from the end of optical fiber 15 such that light is not reflected back into the optical fiber. Instead, light is either absorbed by optical plate 70 or is reflected onto the walls of internal cavity 64. Since no light passes back through optical fiber 15, no light is received by photodetector 44. As a result, no signal (or only a minimal signal) is created by photodetector 44. As a result, the signal does not pass to output circuitry 20. The lack of a signal causes LED 102 to turn off. This action also causes relay 100 to deactivate, thereby causing switch 106 to change positions. In operation, the deactivating of LED 102 provides a visual indication of the external stimulus affecting switch 16. Similarly, relay and driver 100 can be arranged so as to produce a resultant control-type action by the movement of switch 106. Also, the TTL output 104 will send the appropriate signal to the computer that the light is not relfecting from the siwtch 16.

Figure 6:
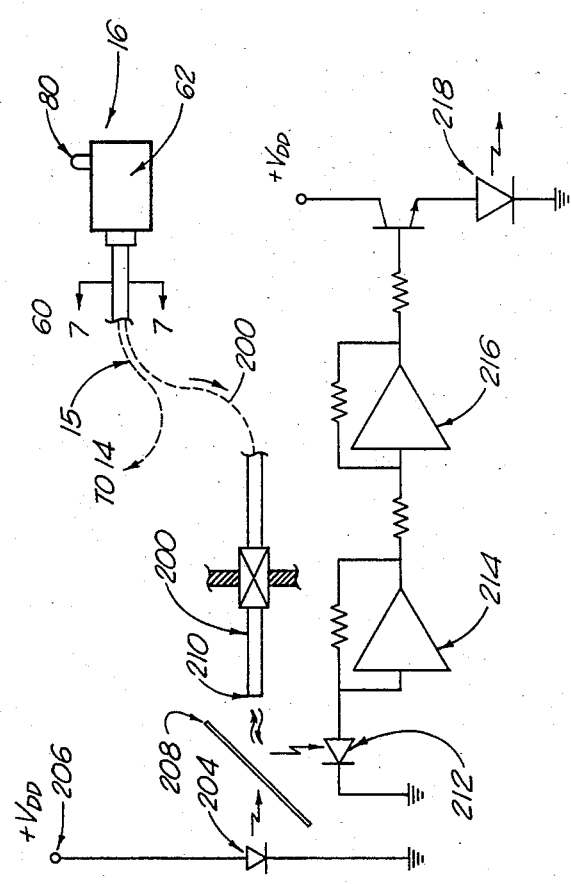
FIG. 6 is a schematic representation of the line-break indicator circuitry supplemental to the electronic circuitry of the fiberoptic switching system.

FIG. 6 illustrates an alternative embodiment of the present invention and, in particular, illustrates a feature which enhances the ability to detect link integrity with regard to the optical path. The additional circuitry, as indicated in FIG. 6, supplements the circuitry shown in FIG. 2. The embodiment as shown in FIG. 2 provides a visual indication of whether or not light is passing through fiberoptics 15. Ideally, light is cut off when plunger 80 of switch 16 is depressed. However, there are certain circumstances, particularly in hazardous environments, where it would be possible that the light transmission would be stopped by the severing of fiberoptics 15. The embodiment of the invention as shown in FIG. 6 can provide a visual indication of such an occurrence.

Figure 7:
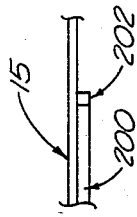
FIG. 7 is an enlarged view of the reflective surface end of the additional fiber.

The main feature of this embodiment is the addition of a separate optical fiber pathway and separate detector circuitry associated with switch 16. Switch 16 is identical to the switch as shown in FIGS. 3 and 4. The first fiberoptic path 15 extends into switch 16 in the same manner as in FIGS. 3 and 4. The other end of fiberoptic path 15 feeds into electronic circuitry of the type illustrated in FIG. 2. The unique aspect of the embodiment of FIG. 6 is the addition of fiberoptics path 200. As seen in FIG. 7, fiberoptics path 200 terminates at one end, in a mirror 202. Mirror 202 assures that all light passing through the fiberoptics 200 is reflected back through the fiberoptics 200. The only circumstance in which light would not be reflected back through the fiberoptics would be when the fiberoptics cable (including fiberoptics 15) is severed. In this circumstance, no light passes through fiberoptics 200 and no light is reflected by mirror 202.

Initially, light is transmitted by light-emitting diode 204 powered by a source of power 206. Unlike the embodiment of FIG. 2, this does not have to be a pulsed light signal but rather may be a constant transmission of light through LED 204. Light passes from LED 204 through another beamsplitter 208 toward the other end of fiberoptics 200. In this manner, light is transmitted from the LED 204 toward reflective surface 202.

Light is transmitted back through the fiberoptics 200 toward beamsplitter 208. The light emitted from the other end 210 of fiberoptics 200 is reflected onto detector 212. The light is received by detector 212 and amplified by light amplifier 214. Voltage amplifier 216 receives the signal from light amplifier 214 and passes it to light-emitting diode 218. Light-emitting diode 218 thereby presents a visual indication of the transmission of light through fiberoptics 200. In addition, it is also within the scope of this embodiment to incorporate the trigger circuit 97 of FIG. 2. This trigger circuit would require the signal to move beyond a threshold level before the indicator 218 would deactivate. This would remove the problems of fluctuations in voltages affecting the electronics of the system. The output of this line-break indicator system could similarly include a suitable relay and driver system 100 and/or TTL output 104, as included with the schematic of FIG. 2.

This embodiment of the present invention supplements the electronics of the previously mentioned embodiment so as to provide assurange that the fiberoptic switch system 10 of the present invention is functioning properly. In particular, if the plunger 80 of switch 16 is depressed, light-emitting diode 102 will turn off while light-emitting diode 218 remains illuminated. This provides the operator of the switch system with the assurance that the plunger 80 has been depressed. If both LEDs 102 and 218 were deactivated, the operator would be informed of the fact that the fiberoptics pathway had been severed.

Figure 8:
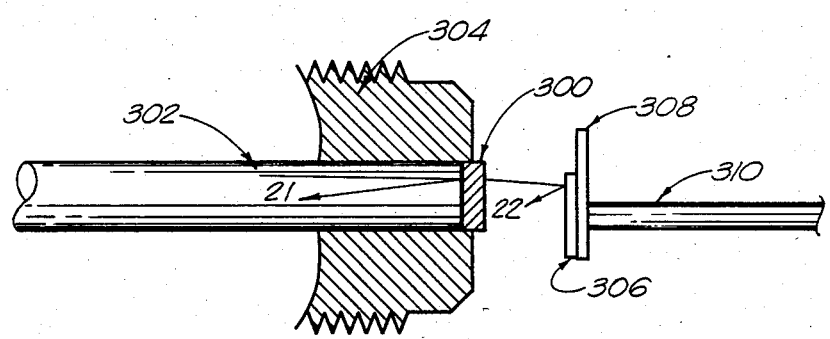
FIG. 8 is an enlarged view of the reflective surface of the switch in relation to an optical fiber of the present invention. The optical fiber is shown with a dichroic mirror at its end.

A variation on this line-break indicator system is shown in FIG. 8. This embodiment of the line-break indicator system employs a dichroic mirror 300 at the end of the single fiberoptic pathway 302. With respect to the embodiment of FIG. 2, the dichroic mirror 300 would be located at the end of optical fiber 15 within switch 16. In this line-break indicator system, there is no need for a second optical fiber. The indication of line integrity is transmitted through the same optical fiber that transmits the status of switch 16.

In FIG. 8, optical fiber 302 extends into and is received by connector 304. Reflective surface 306 is positioned generally adjacent dichroic mirror 300 and the end of fiberoptics 302. Reflective surface 306 is mounted to optical plate 308. Optical plate 308 is fastened to leaf spring 310. The arrangement of reflective surface 306, optical plate 308, and leaf spring 310 is similar to that as shown in FIGS. 3 and 4. While the embodiment as shown in FIG. 8 does not include the ball lens 69 (as shown in FIGS. 3-5), it should be kept in mind that it would be possible to incorporate the ball lens in this embodiment in the same manner as is shown in the previous embodiments.

Dichroic mirror 300 is of the type that is transmissive with respect to certain wavelengths and is reflective with respect to other wavelengths. An illustration of this is seen in FIG. 8, where the wavelength shown as $\lambda_1$ is reflected from dichroic mirror 300 and the wavelength represented by $\lambda_2$ passes through the dichroic mirror and is reflected by reflective surface 306.

The operation of the embodiment of FIG. 8 as a line-break indicator system is described hereinafter. Initially, light is passed through the fiberoptics 302 such that a certain portion of the light is reflected by the dichroic mirror 300 and a certain portion is reflected by reflective surface 306. Typically, in cases where the optical fiber is not severed, the detection circuitry will receive light having both the wavelength $\lambda_1$ and light having the wavelength $\lambda_2$. The output of this system would indicate both that the optical fiber was intact and that the switch was in its normal position. When the switch is moved to its depressed position (as in FIG. 4), the light of wavelength $\lambda_2$ is removed from the spectrum of light received by the photodetector. Under such circumstances, however, the light of wavelength $\lambda_1$ is still being received by the photodetector. The appropriate electronics would produce an output indicative of the fact that the switch was in its depressed position and the line was intact. Finally, in the case where optical fiber 302 has been severed, no light is being reflected back through the optical fiber. The photodetector will respond to this lack of light so as to produce an indication that the optical fiber path has been broken. Through this embodiment of the present invention, it is possible to monitor both the status of the switch and the status of the line through a single optical fiber.

The present invention has a wide range of applications. An example of such an application would be in its use in conjunction with grain silos. As the grain fills the silo, lever 106 starts to depress plunger 80. When the silo's full mark is reached, the reflection of light through optical fiber 15 is stopped. This signal may activate relay 100 so as to shut off the pouring of grain into the silo. Similarly, the deactivation of LED 102 would provide a visual indication to the operators of the silo that the full mark had been reached.

This is but a single application of the present invention. The present invention, in its embodiments, could be widely used in other applications in explosive or otherwise dangerous environments. Similarly, the limit switch of the present invention could be incorporated into areas that have strong electromagnetic interference or areas that are strongly susceptible to electromagnetic interference. Since the switch is a totally passive device, and since no electricity passes through the optical fiber, the present invention is particularly useful in such applications. Furthermore, the design of the present invention eliminates the cost of multiple optical fiber arrangements and complex electronic devices.

The foregoing disclosure and description of the invention is illustrative and explanatory thereof, and various changes in the size, shape, and materials, as well as in the details of the illustrated construction, may be made within the scope of the appended claims without departing from the spirit of the invention. This invention should only be limited by the appended claims and their legal equivalents.

I claim:

1. A fiberoptic switch system comprising:
   a light source means;
   switch means responsive to external stimulus;
   fiberoptic means for transmitting light from said light source means to said switch means, said switch means for reflecting said light from said fiberoptic means, said switch means comprising:
   a housing;
   a receptacle mounted to said housing for receiving said fiberoptic means;
   a reflective surface within said housing; and
   leaf spring means connected to said reflective surface for changing the relative prosition of said reflective surface with respect to said fiberoptic means, said leaf spring means responsive to said external stimulus, said leaf spring means for imparting snap action movement to said reflective surface;
   detector means arranged so as to receive light from said fiberoptic means, said detector means being responsive to said light from said fiberoptic means; and
   output means electrically connected to said detector means for producing a signal relative to said light as received by said detector means.

2. The apparatus of claim 1, said light source means comprising a light-emitting diode.

3. The apparatus of claim 1, the interior of said housing being sealed from the exterior environment.

4. The apparatus of claim 1, said reflective surface movable between a first and second position, said first position being generally adjacent said fiberoptic means so as to reflect said light from said fiberoptic means toward said fiberoptic means.

5. The apparatus of claim 4, said second position generally causing said light from said fiberoptic means to reflect away from said fiberoptic means.

6. The apparatus of claim 4, further including means for adjusting said first and second positions of said reflective surface.

7. The apparatus of claim 4, further including a lens disposed between said reflective surface and said fiberoptic means for focusing light therebetween.

8. The apparatus of claim 1, said fiberoptic means comprising a single optic path.

9. The apparatus of claim 1, further comprising beamsplitter means, said beamsplitter means for passing light from said light source means to said fiberoptic means and passing light from said fiberoptic means to said detector means.

10. The apparatus of claim 1, said detector means comprising a photodetector positioned relative to said fiberoptic means so as to be photoelectrically responsive to light emitted by said fiberoptic means.

11. The apparatus of claim 10, said detector means further comprising:

an amplifier means electrically connected to said photodetector;

rectifier means electrically connected to said amplifier means; and filter means electrically connected to said rectifier means.

12. The apparatus of claim 10, said detector means further comprising a trigger means electrically connected to said photodetector for producing an output of fixed amplitude.

13. The apparatus of claim 1, said output means comprising:

relay means responsive to the signal of said detector means for producing an output signal relative to the light acting on said detector means.

14. The apparatus of claim 4, said output means comprising:

an LED having on/off capability responsive to the position of said reflective surface within said housing of said switch means.

15. The apparatus of claim 1, said output means comprising means for interfacing with a computer system.

16. The apparatus of claim 6, said leaf spring means comprising a leaf spring mounted within said housing, said reflective surface affixed. to one end of said leaf spring, said means for adjusting said first and second positions of said reflective surface comprising:

a first set screw adjustably threadedly fastened to said housing and extending toward said leaf spring, one end of said first set screw abutting said leaf spring when said reflective surface is in one of said first and second positions; and a second set screw adjustably threadly fastened to said housing and extending toward said leaf spring on the opposite side from said first set screw, one end of said second set screw abutting said leaf spring when said reflective surface is in the other of said first and second positions.

17. The apparatus of claim 1, said switch means further comprising:

a plunger extending outwardly from said housing, said plunger having a surface in contact with said leaf spring means interior of said housing;

a bias spring fastened within said housing and having one end coupled to said surface of said plunger so as to exert biasing force on said plunger and said leaf spring means; and an adjustment screw adjustably threadedly fastened to said housing and extending interior of said housing, said adjustment screw contacting said bias spring such that the longitudinal movement of said adjustment screw varies the biasing force of said bias spring.

18. The appratus of claim 1, said leaf spring means comprising:

a leaf spring extending in the interior of said housing, said reflective surface coupled to one end of said leaf spring;

a support tab mounted within the interior of said housing and having a longitudinal axis transverse to the longitudinal axis of said leaf spring, said leaf spring mounted to said support tab; and a positioning spring fastened at one end to said support tab and to said leaf spring at the other end, said positioning spring exerting a force between said support tab and said leaf spring.

* * * * *